United States Patent

Nagaoka et al.

[11] Patent Number: 5,352,737
[45] Date of Patent: Oct. 4, 1994

[54] THERMOPLASTIC RESIN COMPOSITION

[75] Inventors: Kenji Nagaoka, Ichihara; Yasuro Suzuki, Kisarazu; Kaoru Kitadono, Ichihara, all of Japan

[73] Assignee: Sumitomo Chemical Co., Ltd., Osaka, Japan

[21] Appl. No.: 159,590

[22] Filed: Dec. 1, 1993

[30] Foreign Application Priority Data

Dec. 1, 1992 [JP] Japan .................. 4-321631

[51] Int. Cl.$^5$ .................... C08L 71/12; C08L 77/06
[52] U.S. Cl. ...................... 525/66; 525/68; 525/92; 525/391; 525/397; 525/905
[58] Field of Search .............. 525/66, 68, 92, 391, 525/397, 905

[56] References Cited

U.S. PATENT DOCUMENTS

| 4,857,575 | 8/1989 | van der Meer | 524/434 |
| 4,873,286 | 10/1989 | Gallucci et al. | 525/92 |
| 5,166,237 | 11/1992 | Abe et al. | 524/114 |

FOREIGN PATENT DOCUMENTS 4142367  5/1992  Japan .

*Primary Examiner*—James J. Seidleck
*Assistant Examiner*—Thomas Hamilton, III
*Attorney, Agent, or Firm*—Cushman, Darby & Cushman

[57] ABSTRACT

The present invention provides a resin composition which is excellent in adhesion to coatings and which comprises the following components:

(a) a polyphenylene ether in an amount of 10-90 parts by weight,
(b) a polyamide in an amount of 90-10 parts by weight,
(c) a compatibilizing agent in an amount of 0.01-10 parts by weight based on 100 parts by weight of ((a)+(b)),
(d) an unsaturated acid salt of a metal belonging to Groups I-III of the periodic table in an amount of 0.2-10 parts by weight based on 100 parts by weight of ((a)+(b)), and
(e) a rubber material in an amount of 0-100 parts by weight based on 100 parts by weight of ((a)+(b)).

10 Claims, No Drawings

THERMOPLASTIC RESIN COMPOSITION

The present invention relates to a resin composition and more particularly, it relates to a thermoplastic resin composition which comprises a resin mixture of a polyphenylene ether and a polyamide and a salt of an unsaturated acid with a metal belonging to Groups I to III of the periodic table.

Resin compositions comprising polyphenylene ether and polyamide are widely used for exterior automotive trims taking advantage of their excellent heat resistance, impact resistance and mechanical properties. The exterior automotive trims are usually coated, and urethane acrylate resins and aminoacrylic acid resins are used as top coating paints. However, these paints cannot be directly coated on the trims made of resin compositions of polyphenylene ether and polyamide because they are low in adhesion to the compositions. Therefore, at present, shaped articles are first coated with primers and then coated with these top coating paints.

The object of the present invention is to provide a resin composition comprising a polyphenylene ether and a polyamide which is excellent in adhesion to urethane acrylate resin paints or aminoacrylic acid resin paints.

The inventors have conducted intensive research and found that the adhesion is remarkably improved by adding a specific metal salt of unsaturated acid to PPE/PA resin compositions.

That is, the present invention relates to a thermoplastic resin composition which comprises:
(a) 10–90 parts by weight of a polyphenylene ether,
(b) 90–10 parts by weight of a polyamide,
(c) 0.01–10 parts by weight of a compatibilizing agent based on 100 parts by weight of ((a)+(b)),
(d) 0.2–10 parts by weight of an unsaturated acid salt of a metal belonging to Groups I to III of the periodic table based on 100 parts by weight of ((a)+(b)), and
(e) 0–100 parts by weight of a rubber material based on 100 parts by weight of ((a)+(b)).

The polyphenylene ether (a) used in the present invention is a polymer obtained by oxidation polymerization of one or more of phenol compounds having the following formula:

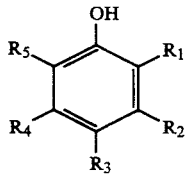

wherein $R_1$, $R_2$, $R_3$, $R_4$ and $R_5$ each represents a hydrogen atom, a halogen atom or an unsubstituted or substituted hydrocarbon group and at least one of them is a hydrogen atom, with oxygen or gas containing the same using an oxidation coupling catalyst.

Examples of $R_1$, $R_2$, $R_3$, $R_4$ and $R_5$ in the above formula are hydrogen, chlorine, bromine, fluorine, iodine, methyl, ethyl, n- or iso-propyl, pri-, sec- or t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and allyl.

Examples of the phenol compounds represented by the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allylphenol. Besides, there may also be used copolymers of the phenol compounds of the above formula with other phenol compounds, for example, polyhydric hydroxy aromatic compounds such as bisphenol-A, tetrabromobisphenol-A, resorcin, hydroquinone and novolak resin.

Among them, preferred compounds are homopolymers of 2,6-dimethylphenol or 2,6-diphenylphenol and copolymers of a large amount of 2,6-xylenol and a small amount of 3-methyl-6-t-butylphenol or 2,3,6-trimethylphenol.

The oxidation coupling catalysts used for oxidation polymerization of the phenol compounds have no special limitation and any catalysts can be used as long as they have polymerization ability.

The polyphenylene ether (a) in the present invention includes mixtures of the above polyphenylene ethers and styrene polymers or the above polyphenylene ethers on which other polymers are grafted.

The above styrene resins are specifically polymers comprising one or more of polymeric units selected from styrene, α-methyl-styrene, p-methylstyrene and the like and examples are polystyrenes, rubber-reinforced polystyrenes, poly-α-methylstyrene, poly-p-methylstyrene and styreneacrylonitrile copolymer.

Amount of the styrene resin mixed or the polymer grafted is desirably 500 parts by weight or smaller based on 100 parts by weight of the polyphenylene ether. If it is larger than 500 parts by weight, heat resistance of the thermoplastic resin composition lowers considerably.

The polyamide (b) used in the present invention is one or more of polyamides selected from homopolyamides and copolyamides obtained by polymerization of lactam or aminocarboxylic acid or polycondensation of a diamine with a dicarboxylic acid or a mixture thereof.

Examples thereof are nylon 6, nylon 66, nylon 64, nylon 10, nylon 11, nylon 12, nylon MXD6 which is a copolymer of m-xylylenediamine with adipic acid, nylon 66/6 copolymer, copolymeric polyamides of p-aminomethylbenzoic acid and ε-caprolactam (nylon AHBA/6), and polyamides mainly composed of 2,2,4-/2,4,4-trimethylhexamethylenediamine.terephthalic acid salts (nylon THDT, THDT/6I).

Blending ratio of the polyphenylene ether (a) and the polyamide (b) is 90–10 parts by weight of the polyamide for 10–90 parts by weight of the polyphenylene ether, preferably 80–20 parts by weight of the polyamide for 20–80 parts by weight of the polyphenylene ether and more preferably 75–40 parts by weight of the polyamide for 25–60 parts by weight of the polyphenylene ether.

The compatibilizing agent (c) used in the present invention is added for improving the compatibility between the polyphenylene ether and the polyamide, namely, for solving the problem that since the polyphenylene ether (a) and the polyamide (c) are inherently inferior in affinity for each other, the PPE particles be able to be dispersed only with a particle size of more than about 10 microns when the two are simultaneously melt kneaded and only very poor mechanical properties be able to be obtained. At least one compound selected from the following groups (A)–(F) can be exemplified as the compatibilizing agent.

(A) Compounds having in the molecule both (i) carbon-carbon double bond or carbon-carbon triple bond and (ii) carboxyl group, acid anhydride group, amino group, acid amide group, imide group, epoxy group, carboxylate ester group, isocyanate group, methylol group, oxazoline ring-containing group or hydroxyl group. Examples of them are maleic acid, maleic anhydride, fumaric acid, unsaturated amines and glycidyl methacrylate and these compounds are described in detail in Japanese Patent Kokai (Laid-Open) Nos. 56-26913 and 56-49753.

(B) Saturated aliphatic polycarboxylic acids and derivatives thereof represented by the following formula:

$(R_1O)_m R(COOR_2)_n (CONR_3R_4)_s$ wherein R represents straight or branched chain aliphatic hydrocarbon group of 2-20, preferably 2-10 carbon atoms; $R_1$ represents hydrogen atom, alkyl group, aryl group, acyl group or carbonyldioxy group, especially preferably hydrogen atom; $R_2$ represents hydrogen atom or alkyl or aryl group of 1-20, preferably 1-10 carbon atoms; $R_3$ and $R_4$ each represents hydrogen atom or alkyl or aryl group of 1-10, preferably 1-6, more preferably 1-4 carbon atoms; $m=1$, $(n+s)$ is an integer of 2 or more, preferably 2 or 3, n is an integer of 0 or more, s is an integer of 0 or more; and ($R_1O$) is located at $\alpha$ or $\beta$ position of the carbonyl group and 2-6 carbon atoms are present between at least two carbonyl groups. Examples of the compounds are ester compounds, amide compounds, anhydrides, hydrates and salts of the saturated aliphatic polycarboxylic acids. Examples of the saturated aliphatic polycarboxylic acids are citric acid, malic acid and agaricic acid. Details of these compounds are disclosed in Patent Kohyo No. 61-502195.

(C) Compounds represented by the formula:

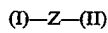

$(I)—Z—(II)$ wherein (I) is at least a group of the formula $(X—CO)—$, where X is F, Cl, Br, I, OH, OR or $—O—CO—R$ in which R is H, alkyl group or aryl group, (II) is at least carboxylic acid group, acid anhydride group, acid amide group, imide group, carboxylate ester group, amino group or hydroxyl group, and the groups (I) and (II) are covalently bonded through Z which is a divalent hydrocarbon. Examples of the compounds are chloroformylsuccinic anhydride, chloroethanoylsuccinic anhydride, anhydrotrimellitic acid chloride, anhydrotrimellitic acetic anhydride and terephthalic acid chloride.

(D) Silane compounds having in their molecular structure both (i) at least one silicon atom bonded to a carbon atom through a bridge of oxygen and (ii) at least ethylenic carbon-carbon double bond or carbon-carbon triple bond and/or functional group selected from amino group and mercapto group with a proviso that said functional group does not directly bond to silicon atom.

(E) Oxidized polyolefin waxes.

(F) Copolymers having unit of vinyl aromatic compounds and unit of $\alpha,\beta$-unsaturated dicarboxylic acids or dicarboxylic acid anhydrides or unit of vinyl aromatic compounds and unit of imide compounds of $\alpha,\beta$-unsaturated dicarboxylic acids.

The compatibilizing agents used in the present invention are not limited to the above-exemplified compounds and may be any compounds which are used for improving the compatibility of the polyphenylene ether and the polyamide. These may be used each alone or in combination of two or more.

Amount of the compatibilizing agent (c) is 0.01-10 parts by weight on the basis of 100 parts by weight in total of polyphenylene ether (a) and polyamide (b) ((a)+(b)). If it exceeds 10 parts by weight, considerable reduction in strength occurs due to decrease in heat resistance and degradation. The amount is preferably 0.05-8 parts by weight, more preferably 0.1-5 parts by weight. Radical initiators such as organic peroxides may be used together with the compatibilizing agent.

The unsaturated acid salts (d) of metals belonging to Groups I to III in the periodic table include, for example, unsaturated carboxylates of zinc, calcium, magnesium and the like. They may be used each alone or as a mixture of two or more. Preferred are zinc dimethacrylate and zinc diacrylate.

Amount of the unsaturated acid salts (d) of metals belonging to Groups I to III in the periodic table is 0.2-10 parts by weight on the basis of 100 parts by weight of ((a)+(b)). If it is less than 0.2 part by weight, the effect of improvement is small and if it exceeds 10 parts by weight, properties of the composition deteriorate considerably. The amount is more preferably 0.3-5 parts by weight, most preferably 0.4-3 parts by weight.

The rubber materials (e) include natural and synthetic polymer materials which are elastic at room temperature and may be used in PPE/PA resin compositions for improving impact characteristics. Especially preferred are ethylene-propylene rubber, ethylene-propylene-nonconjugated diene rubber, ethylene-butene-1 rubber, polybutadiene, styrene-butadiene block copolymer rubber, styrene-butadiene copolymer rubber, partially hydrogenated styrene-butadiene-styrene block copolymer rubber, styrene-isoprene block copolymer, partially hydrogenated styrene-isoprene block copolymer, polyurethane rubber, styrene-grafted ethylene-propylene-nonconjugated diene rubber, styrene-grafted ethylene-propylene rubber, styrene/acrylonitrile-grafted ethylene-propylene-nonconjugated diene rubber, styrene/acrylonitrile-grafted ethylene-propylene rubber and mixtures thereof. Furthermore, there may be used rubbers modified with other functional monomers containing acids, epoxy or the like.

Amount of the rubber materials (e) is 0-100 parts by weight, preferably 5-100 parts by weight based on 100 parts by weight of ((a)+(b)). If the amount exceeds 100 parts by weight, rigidity of the resin compositions markedly decreases.

If necessary, inorganic fillers may be added to the resin composition for improvement of rigidity or hardness. Suitable fillers include calcium carbonate, magnesium carbonate, aluminum hydroxide, magnesium hydroxide, zinc oxide, titanium oxide, aluminum silicate, magnesium silicate, calcium silicate, silicic acid, hydrated calcium silicate, hydrated aluminum silicate, mica, mineral fibers, xonotlite, potassium titanate whiskers, magnesium oxysulfate, glass balloons, inorganic fibers such as glass fibers, glass beads, carbon fibers and stainless steel fibers, aramid fibers and carbon black. These fillers may be added each alone or in combination of two or more. These fillers are not limitative.

Amount of the fillers is 0-200 parts by weight based on 100 parts by weight of ((a)+(b)). If the amount exceeds 200 parts by weight, impact resistance of the composition considerably decreases or flowability at the time of molding considerably reduces.

The thermoplastic resin composition of the present invention is obtained by blending the components (a)–(e) by known methods and melt kneading the blend by an extruder or the like. The sequence of blending and kneading of the components is not limitative. For example, an optional combination of the components may be separately kneaded and all of the respective combinations may be blended and kneaded. Alternatively, using an extruder provided with a plurality of feed openings, one or more of the components may be successively fed to the extruder from the feed openings along the cylinder.

Any of the following methods may be employed, but it is preferred that polyphenylene ether (a) has been kneaded with compatibilizing agent (c) before polyamide (b) is kneaded.

That is, a method which comprises melt-kneading the components (a)–(e) at the same time; a method which comprises previously melt-kneading the components (a), (c) and (d) in the presence or absence of a radical initiator and then adding the components (b) and (e) and melt-kneading them; a method which comprises previously melt-kneading the components (a), (c), (d) and (e) in the presence or absence of a radical initiator and then adding the component (b) and melt-kneading them; a method which comprises previously pre-kneading the components (a), (c) and (e) and then adding the components (b) and (d) and melt-kneading them; a method which comprises previously pre-kneading the components (a) and (c) and then adding the components (b), (d) and (e) and melt-kneading them.

Customary additives such as flame retardants, plasticizers, anti-oxidants and weathering agents may further be added to the composition of the present invention. Further preferable effects can be obtained especially when materials known as additives for the polyphenylene ether or the polyamide are used.

The thermoplastic resin composition of the present invention can be used to produce exterior and interior parts of automobile and electrical appliance, such as bumper, wheel cap and housing frame of radio or television set.

The following examples are set forth for purposes of the present invention. It should be understood that they are exemplary only, and should not be construed as limiting the invention in any manner.

Paints used for evaluation of adhesion and method for measurement of adhesion which were used in examples and comparative examples are as follows:

(1) Paint: Acrylic urethane resin paint (Soflex ® 5000 manufactured by Kansai Paint Co., Ltd.)and urethane resin paint (R271 manufactured by Japan Bee Chemical Co., Ltd.) were diluted with thinners exclusively used for them and coated on the molded products. Baking was carried out under the conditions for respective paints.

(2) Adhesion: The product was subjected to adhesion test of 100 squares of 1 mm×1 mm in accordance with JIS K5400-1979 and proportion of the unpeeled squares was measured (the number of unpeeled squares of 1 mm×1 mm/100 squares).

EXAMPLE 1

Thirtyfive parts by weight of polyphenylene ether having an intrinsic viscosity of 0.46 measured in a chloroform solution of 0.5 g/dl at 30° C. and 0.3 part by weight of maleic anhydride as a compatibilizing agent were charged in a continuous twin-screw kneader (TEM-50 manufactured by Toshiba Machine Co., Ltd.) through a first hopper and then 30 parts by weight of a polyamide (Unitika Nylon ® A1020BRL manufactured by Unitika Co.), 10 parts by weight of a styrene-butadiene triblock copolymer (Califlex ® TR1101 manufactured by Shell Chemical Co.) as a rubber material, 25 parts by weight of a high-impact strength polystyrene (Esbright ® 500SX manufactured by Japan Polystyrene Kogyo Co.) and 0.5 part by weight of zinc dimethacrylate as an unsaturated acid salt of metal were charged through a second hopper located between the first hopper and the air vent using a metering feeder. The mixture was melt-kneaded and granulated at a cylinder temperature of 260° C. and at a screw rotation of 330 rpm to obtain a thermoplastic resin composition. The resulting composition was injection molded into a flat plate by an injection molding machine. The acrylic urethane resin paint was air-spray coated on the plate and left for 10 minutes at room temperature and baked at 80° C. for 30 minutes. Thickness of the coat was 40μ. Adhesion of the coat was measured and the results are shown in Table 1.

EXAMPLE 2

Twenty parts by weight of polyphenylene ether having an intrinsic viscosity of 0.46 measured in a chloroform solution of 0.5 g/dl at 30° C. and 0.2 part by weight of maleic anhydride as a compatibilizing agent were charged in a continuous twin-screw kneader (TEM-50 manufactured by Toshiba Machine Co., Ltd.) through a first hopper and then 35 parts by weight of a polyamide (Unitika Nylon ® A1020BRL manufactured by Unitika Co.), 45 parts by weight of a styrene-butadiene triblock copolymer (Califlex ® TR1101 manufactured by Shell Chemical Co.) as a rubber material and 1.0 part by weight of zinc dimethacrylate as an unsaturated acid salt of metal were charged through a second hopper located between the first hopper and an air vent using a metering feeder. The mixture was melt-kneaded and granulated at a cylinder temperature of 260° C. and at a screw rotation of 330 rpm to obtain a thermoplastic resin composition. The resulting composition was injection molded into a flat plate by an injection molding machine. The urethane resin paint was air-spray coated on the plate and left for 10 minutes at room temperature and baked at 80° C. for 30 minutes. Thickness of the coat was 40μ. Adhesion of the coat was measured and the results are shown in Table 1.

Comparative Example 1

Example 1 was repeated except that zinc dimethacrylate was not added. The results of evaluation are shown in Table 1.

Comparative Example 2

Example 1 was repeated except that zinc distearate was used in place of zinc dimethacrylate. The results of evaluation are shown in Table 1.

Comparative Example 3

Example 2 was repeated except that zinc dimethacrylate was not added. The results of evaluation are shown in Table 1.

EXAMPLE 3

Example 1 was repeated except that magnesium diacrylate was used in place of zinc dimethacrylate. The results of evaluation are shown in Table 1.

EXAMPLE 4

Example 1 was repeated except that zinc diacrylate was used in place of zinc dimethacrylate. The results of evaluation are shown in Table 1.

TABLE 1

| Metal salts of unsaturated acids | | Adhesion | |
|---|---|---|---|
| | | Acrylic urethane resin paint | Urethane resin paint |
| Example 1 | Zinc dimethacrylate 0.5 part | 100/100 | — |
| Example 2 | Zinc dimethacrylate 1.0 part | — | 100/100 |
| Example 3 | Magnesium diacrylate 0.5 part | 100/100 | — |
| Example 4 | Zinc diacrylate 0.5 part | 100/100 | — |
| Comp. Example 1 | No addition | 0/100 | — |
| Comp Example 2 | Zinc distearate 0.5 part | 50/100 | — |
| Comp. Example 3 | No addition | — | 0/100 |

As explained above, the present invention provides a resin composition comprising a polyphenylene ether and a polyamide which is excellent in adhesion to coating.

We claim:

1. A thermoplastic resin composition which comprises:
   (a) a polyphenylene ether in an amount of 10–90 parts by weight,
   (b) a polyamide in an amount of 90–10 parts by weight,
   (c) a compatibilizing agent in an amount of 0.01–10 parts by weight based on 100 parts by weight of ((a)+(b)),
   (d) an unsaturated acid salt of a metal belonging to Groups I–III of the periodic table in an amount of 0.2–10 parts by weight based on 100 parts by weight of ((a)+(b)), and
   (e) a rubber material in an amount of 0–100 parts by weight based on 100 parts by weight of ((a)+(b)).

2. A thermoplastic resin composition according to claim 1, wherein (c) the compatibilizing agent is at least one compound selected from the following (A)–(F):
   (A) compounds having in the molecule both (i) carbon-carbon double bond or carbon-carbon triple bond and (ii) carboxyl group, acid anhydride group, amino group, acid amide group, imide group, epoxy group, carboxylate ester group, isocyanate group, methylol group, oxazoline ring-containing group or hydroxyl group;
   (B) saturated aliphatic polycarboxylic acids and derivatives thereof represented by the following formula:

$$(R_1O)_mR(COOR_2)_n(CONR_3R_4)_s$$

wherein R represents a straight or branched chain aliphatic hydrocarbon group of 2–20, carbon atoms; $R_1$ represents a hydrogen atom, an alkyl group, an aryl group, an acyl group or a carbonyldioxy group; $R_2$ represents a hydrogen atom or an alkyl or aryl group of 1–20; $R_3$ and $R_4$ each represents a hydrogen atom or an alkyl or aryl group of 1–10 carbon atoms; m=1, (n+s) is an integer of 2 or more, n is an integer of 0 or more, s is an integer of 0 or more; and ($R_1O$) is located at $\alpha$ or $\beta$ position of the carbonyl group and 2–6 carbon atoms are present between at least two carbonyl groups;
   (C) compounds represented by the formula:

$$(I)—Z—(II)$$

wherein (I) is at least a group of the formula (X—CO)—, where X is F, Cl, Br, I, OH, OR or —O—CO—R in which R is H, alkyl group or aryl group, (II) is at least carboxylic acid group, acid anhydride group, acid amide group, imide group, carboxylate ester group, amino group or hydroxyl group, and the groups (I) and (II) are covalently bonded through Z which is divalent hydrocarbon;
   (D) silane compounds having in their molecular structure both (i) at least one silicon atom bonded to carbon atom through a bridge of oxygen and (ii) at least ethylenic carbon-carbon double bond or carbon-carbon triple bond and/or functional group selected from amino group and mercarpto group with a proviso that said functional group does not directly bond to silicon atom;
   (E) oxidized polyolefin waxes, and
   (F) copolymers having unit of vinyl aromatic compounds and unit of $\alpha,\beta$-unsaturated dicarboxylic acids or dicarboxylic acid anhydrides or unit of vinyl aromatic compounds and unit of imide compounds of $\alpha,\beta$-unsaturated dicarboxylic acid.

3. A thermoplastic resin composition according to claim 1, wherein (d) the metal of unsaturated acid salts is zinc, calcium or magnesium.

4. A thermoplastic resin composition according to claim 1, wherein (e) the rubber material is a natural or a synthetic polymer which is elastic at room temperature.

5. A molded article obtained by the thermoplastic resin composition according to claim 1.

6. A thermoplastic resin composition according to claim 1, wherein (c) the compatibilizing agent is at least one compound selected from the following (A)–(F):
   (A) compounds having in the molecule both (i) carbon-carbon double bond or carbon-carbon triple bond and (ii) carboxyl group, acid anhydride group, amino group, acid amide group, imide group, epoxy group, carboxylate ester group, isocyanate group, methylol group, oxazoline ring-containing group or hydroxyl group;
   (B) saturated aliphatic polycarboxylic acids and derivatives thereof represented by the following formula:

$$(R_1O)_mR(COOR_2)_n(CONR_3R)_s$$

wherein R represents a straight or branched chain aliphatic hydrocarbon group of 2–10 carbon atoms; $R_1$ represents a hydrogen atom, an alkyl group, an aryl group, an acyl group or a carbonyldioxy group; $R_2$ represents a hydrogen atom or an alkyl or aryl group of 1–10 carbon atoms; $R_3$ and $R_4$ each represents a hydrogen atom or an alkyl or aryl group of 1-6 carbon atoms, m=1, (n+s) is 2 or 3, n is an integer of 0 or more, s is an integer of 0 or more; and ($R_1O$) is located at $\alpha$ or $\beta$ position of the carbonyl group and 2-6 carbon atoms are present between at least two carbonyl groups;

(C) compounds represented by the formula:

(I)—Z—(II)

wherein (I) is at least a group of the formula (X—CO)—, where X is F, Cl, Br, I, OH, OR or —O—CO—R in which R is H, alkyl group or aryl group, (II) is at least a carboxylic acid group, acid anhydride group, acid amide group, imide group, carboxylate ester group, amino group or hydroxyl group, and the groups (I) and (II) are covalently bonded through Z which is divalent hydrocarbon;

(D) silane compounds having in their molecular structure both (i) at least one silicon atom bonded to carbon atom through a bridge of oxygen and (ii) a least ethylenic carbon-carbon double bond or carbon-carbon triple bond and/or functional group selected from amino group and mercarpto group with a proviso that said functional group does not directly bond to silicon atom;

(E) oxidized polyolefin waxes, and (F) copolymers having unit of vinyl atomatic compounds and unit of $\alpha,\beta$-unsaturated dicarboxylic acids or dicarboxylic acid anhydrides or unit of vinyl aromatic compounds and unit of imide compounds of $\alpha,\beta$-unsaturated dicarboxylic acid.

7. A thermoplastic resin composition according to claim 6 wherein $R_1$ represents a hydrogen atom.

8. A thermoplastic resin composition according to claim 6, wherein $R_3$ and $R_4$ each represents an alkyl group having from 1-4 carbon atoms.

9. A molded article obtained from the thermoplastic resin composition according to claim 2.

10. A molded article obtained from the thermoplastic resin composition according to claim 6.

* * * * *